United States Patent [19]

Takata et al.

[11] Patent Number: 5,526,201
[45] Date of Patent: Jun. 11, 1996

[54] MAGNETIC DISK APPARATUS

[75] Inventors: Yoshiyuki Takata; Kazuhisa Yamamato, both of Kawasaki, Japan

[73] Assignee: Fujitsu Limited, Japan

[21] Appl. No.: 346,823

[22] Filed: Nov. 29, 1994

Related U.S. Application Data

[63] Continuation of Ser. No. 21,252, Feb. 23, 1993, abandoned.

[30] Foreign Application Priority Data

Mar. 31, 1992 [JP] Japan .................................. 4-076627
Mar. 31, 1992 [JP] Japan .................................. 4-076628

[51] Int. Cl.$^6$ ................................................ G11B 5/596
[52] U.S. Cl. ................................. 360/77.04; 360/75
[58] Field of Search ........................... 360/73.03, 73.02, 360/78.04, 77.04, 77.05, 75; 395/438, 439

[56] References Cited

U.S. PATENT DOCUMENTS

| | | | |
|---|---|---|---|
| 4,819,095 | 4/1989 | Asano et al. | 360/77.04 |
| 4,907,105 | 3/1990 | Kurzweil, Jr. | 360/73.02 |
| 4,969,059 | 11/1990 | Volz et al. | 360/77.04 X |
| 5,109,502 | 4/1992 | Sasamoto et al. | 360/77.04 X |
| 5,185,681 | 2/1993 | Volz et al. | 360/77.05 |
| 5,347,410 | 9/1994 | Narita et al. | 360/77.04 |

FOREIGN PATENT DOCUMENTS

| | | |
|---|---|---|
| 56-41562 | 4/1981 | Japan . |
| 62-222467 | 9/1987 | Japan . |
| 63-100681 | 5/1988 | Japan . |
| 63-142513 | 6/1988 | Japan . |
| 63-209077 | 8/1988 | Japan . |
| 63-306571 | 12/1988 | Japan . |
| 1-211279 | 8/1989 | Japan . |
| 1-296470 | 11/1989 | Japan . |
| 2-208877 | 8/1990 | Japan . |
| 3-245377 | 10/1991 | Japan . |

*Primary Examiner*—Aristotelis Psitos
*Assistant Examiner*—James T. Wilson
*Attorney, Agent, or Firm*—Greer, Burns & Crain Ltd.

[57] ABSTRACT

A seek command including a cylinder address and a head address is generated from a disk control unit. In a magnetic disk unit, an off-track amount is read out by the head address obtained by the reception of the seek command with reference to a correction table, and an off-track correcting state in which the off-track amount is eliminated from a position control signal is produced during the seeking operation until the start of the position control. A function to instruct the dependent magnetic disk unit to execute the measuring process of the off-track amount in accordance with a time schedule stored in a time table is provided for a higher-order magnetic disk control unit. The generation of a measuring command during the execution of a command chain is suppressed. When receiving the measuring command from the disk control unit, the magnetic disk unit measures the off-track amount of each data disk for a reference position of a servo disk and stores into the correction table.

10 Claims, 16 Drawing Sheets

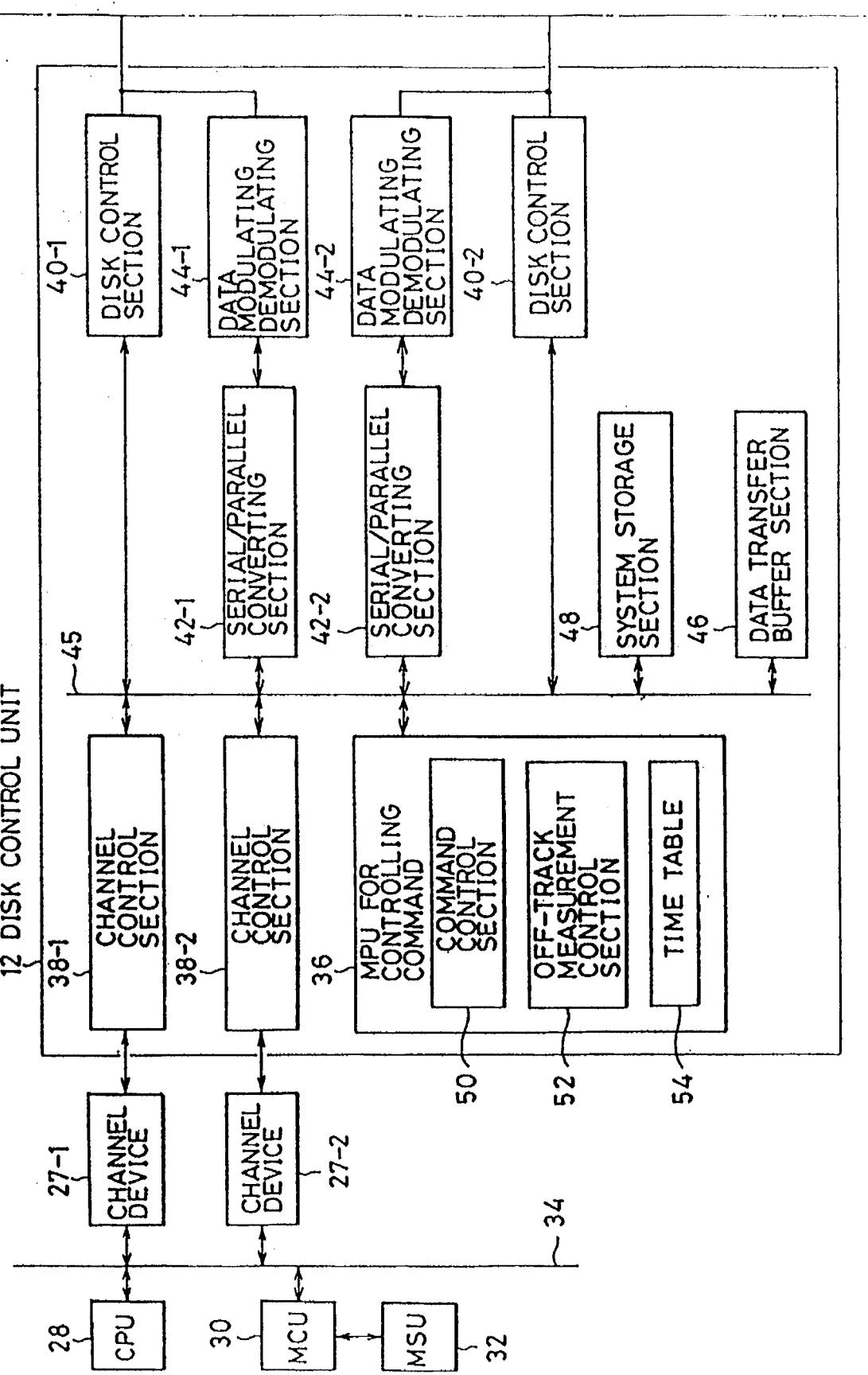

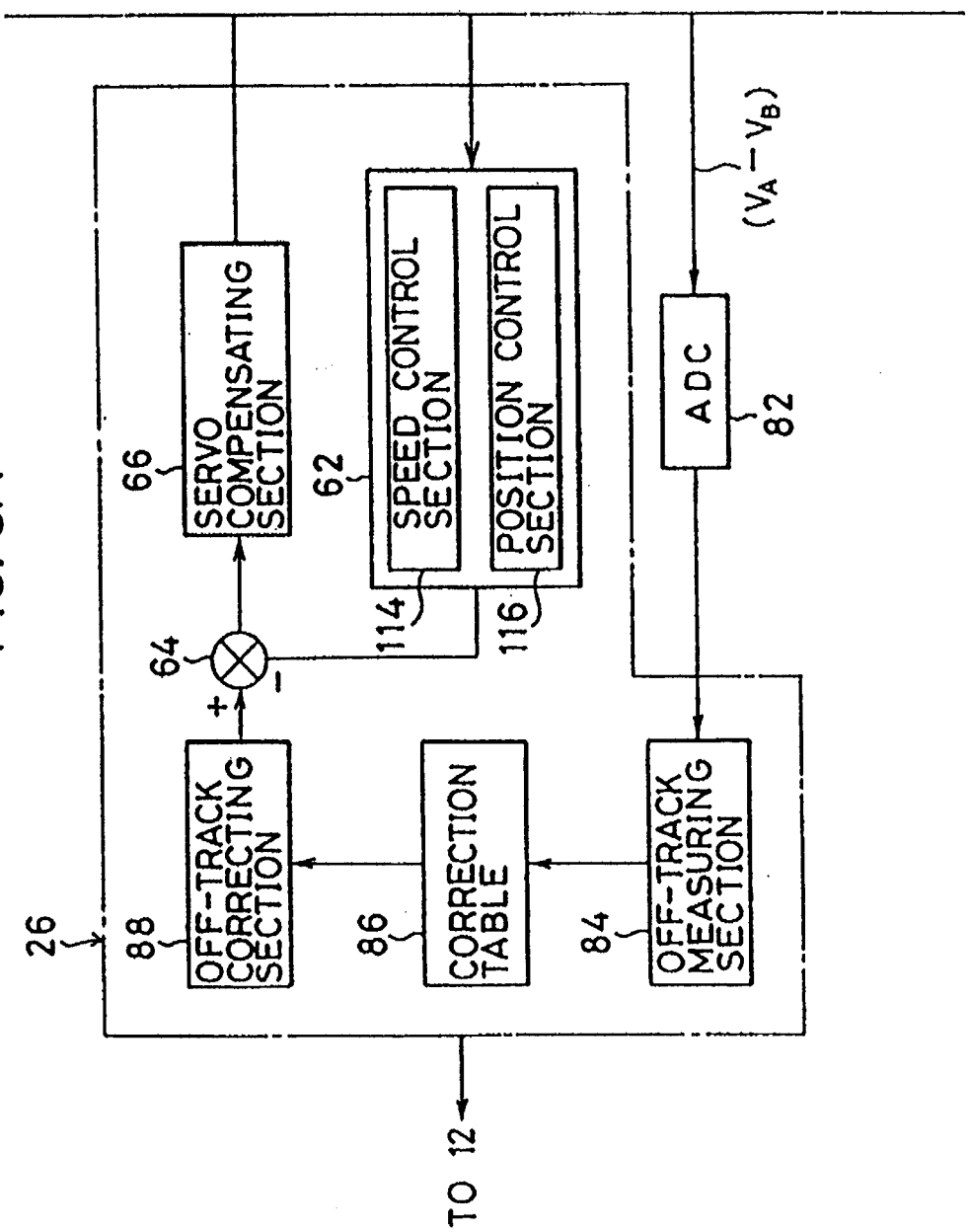

FIG. 6A POSN
FIG. 6B POSQ
FIG. 6C N>Q
FIG. 6D (N+Q)>0
FIG. 6E TxPL
FIG. 6F POSITION DATA (POSITION SIGNAL)

MAGNETIC DISK APPARATUS

RELATED APPLICATION

This is a continuation of application Ser. No. 08/021,252, filed on Feb. 23, 1993, now abandoned.

BACKGROUND OF THE INVENTION

The present invention relates to a magnetic disk apparatus having an off-track correcting function to correct an off-track amount that is peculiar to a data head upon positioning of the head and, more particularly, to a magnetic disk apparatus for measuring an off-track amount during the operation of the apparatus and for forming a correction table.

In the present magnetic disk apparatus, the improvement of the performance such as large memory capacity, high data transfer speed, or the like is more and more progressed. The miniaturization of the magnetic disk apparatus is also more and more progressed to meet requirements from installation circumstances such as reduction of a space of a computer center or decrease in electric power consumption and to improve an access time. A track density (TPI) in the radial direction per inch of the magnetic disk and a recording density (BPI) in the circumferential direction per inch are also more and more increased.

When the recording density is raised as mentioned above, to prevent the occurrence of an off-track due to a temperature change or the like, it is important to measure an off-track amount for a reference position and to execute an off-track correction upon positioning of the head.

Hitherto, in the case where the track density rises because a track interval is narrowed in the magnetic disk apparatus, according to the conventional head positioning control by only servo information of the servo surface, the position of a data head is deviated from the position of a servo head due to an environmental change in temperature of the apparatus, an external force which is applied to a head actuator, or the like. Even when the seeking operation is performed, therefore, there is a fear that an off-track occurs between the present track and a target track and the reading and writing operations cannot be stably executed. On the other hand, inconveniences such that the seeking operation becomes unstable and a settling time becomes long occur.

To eliminate the above problems, there is performed an off-track correction such that servo information is recorded into the data surface of a disk medium and an off-track amount is previously measured every data head and, when a control mode is switched to a position control after completion of the seeking operation, the head is moved in such a direction as to eliminate the measured off-track amount.

That is, when a disk control unit receives a command chain from a higher-order CPU, the disk control unit executes a speed control such that a seek command including a cylinder address is supplied to the magnetic disk unit and the head is moved to a target cylinder position by a magnetic disk apparatus.

In the speed control, an acceleration current is first supplied to a voice coil motor as a head actuator, the voice coil motor is accelerated to a predetermined speed, and the number of remaining tracks until the target cylinder position is detected during the speed control. When the number of remaining tracks is reduced to a predetermined value, a deceleration current is supplied to the voice coil motor. When the head speed drops to a predetermined speed or less, the control mode is switched to the position control and the head is pulled into the track center, thereby allowing the head to trace the track.

At the same time, the completion of the seeking operation is reported to a higher-order disk control unit. When a head address is designated, the reading or writing operation is executed. On the other hand, on the basis of the designated head address, a position control signal is corrected so as to eliminate the read-out off-track amount with reference to tile correction table in which the off-track amounts which had previously been measured have been stored.

In such a conventional off-track correction, however, after the head address for the reading or writing operation in association with the completion of the seeking operation of the head to the target cylinder position was received, the off-track correction is executed on the basis of the off-track amount read out from the correction table. Therefore, there is a problem such that the off-track correction overlaps the reading or writing operation and the reading or writing operation is waited by a time corresponding to one rotation of the disk in order to perform the off-track correction, so that an access performance deteriorates.

On the other hand, in the measurement of the off-track amount to form the correction table, each of a plurality of magnetic disk units connected manages a time schedule by itself under the control of a magnetic disk control unit, and the off-track measuring process is executed every elapse of a set time.

In the off-track measuring process, the head is sought to the cylinder position on the outside of the magnetic disk data surface where servo information for off-track measurement has been recorded. After completion of the seeking operation, the data heads are sequentially switched, the servo information is read out, and the off-track amount is detected and stored into the correction table in which the head numbers are used as address pointers.

In the conventional off-track measurement as mentioned above, the magnetic disk unit itself executes the off-track measuring process independently of the higher-order disk control unit. There is, consequently, an inconvenience such that the higher-order disk control unit cannot grasp a state of the off-track measuring process in the dependent magnetic disk unit.

That is, after completion of the activation due to the turn-on of the power source of the apparatus, each magnetic disk unit activates a timer which is used for the off-track measurement and executes the off-track measuring process by the interruption each time a preset time elapses. Therefore, there is a case where the off-track measuring process is started due to the interruption during the execution of the command chain from the higher-order apparatus. The execution of the command chain waits until the end of the off-track measuring process and the accessing performance is reduced.

On the other hand, when the disk control unit receives a new command chain from the higher-order apparatus, it is necessary to inquire of the designated magnetic disk unit whether the off-track measuring process is being executed or not. A path is occupied during a period of time for such an inquiry and a frequency of the accessing times to the path increases, so that there is a fear such that a path-busy state frequently occurs.

Further, all of the timers each for detecting the time schedule for the off-track measurement are almost simultaneously started upon completion of the activation after the power source was turned on. However, deviations occur among the counting times of the timers due to various kinds of variations among the magnetic disk units. When the apparatus is used for a long time, the off-track measuring process is executed substantially at random. Therefore, even if the off-track measuring process of a special magnetic disk unit is known by the disk control unit, the operation timings of the other magnetic disk apparatuses are not always set to the off-track measurement timing, it is also difficult to manage in a manner such that by knowing the off-track measurement of one magnetic disk unit, the off-track measurement of the other magnetic disk units is presumed.

SUMMARY OF THE INVENTION

According to a magnetic disk apparatus of the present invention, at the start of the reading or writing operation, The off-track correction can be performed without waiting for the disk rotation.

The magnetic disk apparatus of the present invention has a disk control unit for decoding a command from a higher-order apparatus, for generating a seek command including a cylinder address and a head address, and for generating a read command or a write command subsequent to the seek command. Therefore, by receiving the seek command, a lower-order magnetic disk unit knows the head address and can read out an off-track amount from a correction table at the start of the seeking operation.

In a manner similar to the ordinary magnetic disk apparatus, further, the magnetic disk apparatus comprises: a servo information reading section to read out servo information by using a servo head from a disk medium for servo on which the servo information has previously been recorded; a data write/read section for selecting either one of a plurality of data heads each of which is provided for each of a plurality of disk media for data to record data and for writing or reading out the data; a speed control section for moving the head toward the designated cylinder address position by a seek command and for performing a speed control of the head on the basis of the servo information derived from the servo information reading section; and a position control section for pulling in the head to the track center when the head reaches a position just before the designated cylinder address position by the speed control and for allowing the head to trace the track.

The magnetic disk apparatus of the present invention, further, has a correction table in which an off-track amount of each data head when the servo head is positioned to a reference cylinder position of a servo disk has previously been stored. The magnetic disk apparatus also has an off-track correcting section which is constructed in a manner such that when the seek command is received, the off-track amount is read out in the designated head address with reference to the correction table, and an off-track correcting state in which the off-track amount is eliminated from a position control signal in a position control section is formed for a period of time during which the head is moved to the designated cylinder address.

When the control mode is switched to the position control after completion of the seeking operation, accordingly, the head can immediately be pulled in to the center of the target track by the position control accompanied with the off-track correction and can be allowed to trace the track. The reading or writing operation can be soon started after completion of the seeking operation without waiting for the rotation of the disk for off-track correction.

According to the magnetic disk control apparatus of the present invention, the off-track measuring process which is executed during the operation of the apparatus can be efficiently managed.

In the magnetic disk apparatus of the invention, accordingly, the data control unit has an off-track measurement control section for instructing the lower-order magnetic disk unit to execute the measuring process of the off-track amount in accordance with a time schedule stored in a time table. Each of the dependent magnetic disk units which are connected under control of the disk control unit has an off-track measuring section for measuring an off-track amount of each data head at a time point when the servo head has been positioned to a reference cylinder position of the servo disk and for storing the off-track amount into the correction table when a measuring command is received from the off-track measurement control section.

An off-track measurement control section instructs the off-track measuring process in accordance with a time table in which a time interval according to a change in environmental temperature just after the power source of the apparatus was turned on has been set. Practically speaking, the off-track measuring process is instructed in accordance with the time table in which a time interval which sequentially becomes long in accordance with the elapse of time just after the turn-on of the power source of the apparatus has been set.

When the off-track measuring process is instructed, the off-track measurement control section judges whether the magnetic disk unit is executing the command chain or not. After waiting for the end of the execution of the command chain, the off-track measurement control section instructs the off-track measuring process.

Further, first and second servo information have previously been recorded on a cylinder position of a data disk corresponding to a reference cylinder position of the servo disk so as to have offset of only predetermined amounts in the different directions for the track center. An off-set measuring section, therefore, calculates an off-track amount $\alpha$ on the basis of a differential signal $(V_1 - V_2)$ of read signals $V_1$ and $V_2$ of the first and second servo information recorded on the data disk and stores the calculated off-track amount $\alpha$ into the correction table.

According to the present invention as mentioned above, since all of the off-track measuring processes of a plurality of magnetic disk units are managed by the higher-order disk control unit, the disk control unit can grasp all of the situations of the off-track measuring processes without inquiring to the dependent magnetic disk units.

Therefore, even when a read or write interruption request is generated at an off-track measurement start timing according to the time schedule, for the magnetic disk apparatus which is executing the command chain, the generation of an off-track measuring command is suppressed and waited until the end of execution of the command chain. The off-track measuring process can be executed by using an idle time without losing the execution of the command chain. The access performance, therefore, is improved.

The inquiry of the magnetic disk unit whether the off-track is being measured or not which is executed each time the command chain is received is unnecessary. Therefore, an occupation ratio of the path is reduced by an amount corresponding to such an unnecessary inquiry. The use of the path can be opened to another use request. The processing time is decreased by a time corresponding to such a reduced occupation ratio of the path.

Further, since the off-track measuring processes are managed in a lump by the disk control unit, the timers each of which is provided for each magnetic disk unit becomes unnecessary and the control circuit can be simplified.

Although the present invention relates to the magnetic disk array in which a plurality of magnetic disk units are connected under control of the disk control unit, the invention can be also applied to an ordinary magnetic disk apparatus in which one magnetic disk unit is connected.

The above and other objects, features, and advantages of the present invention will become apparent from the following detailed description and the appended claims with reference to the accompanying drawings.

BRIEF DESCRIPTION OF THE DRAWINGS

FIGS. 1A and 1B are a block diagram showing a hardware construction of the present invention;

FIGS. 3A and 3B are a block diagram showing the details of a magnetic disk unit in FIG. 1;

DETAILED DESCRIPTION OF THE PREFERRED EMBODIMENT

Figure 1B:
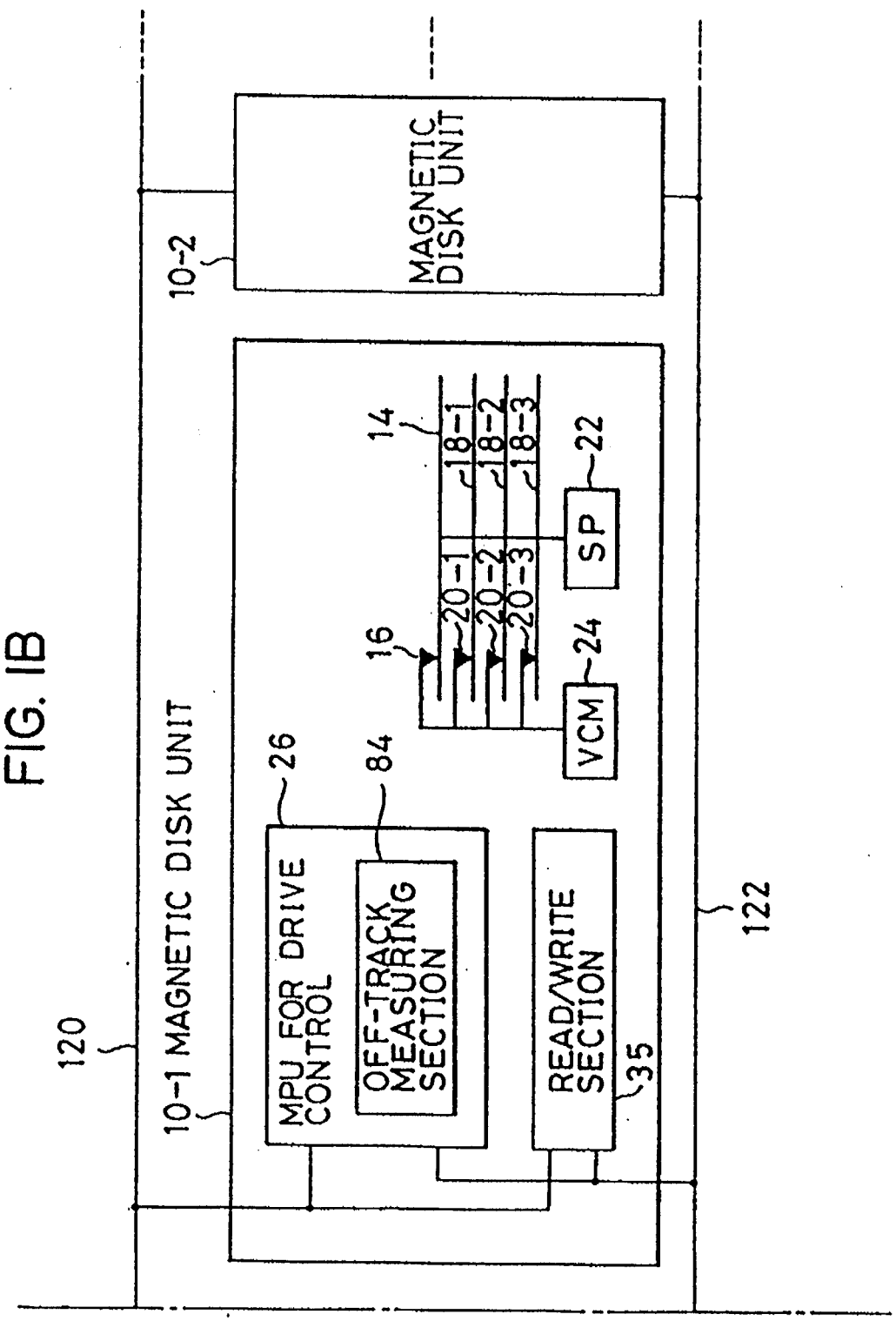

In FIG. 1, a magnetic disk apparatus of the present invention is constructed by a disk array comprising: a disk control unit 12 which is located on the higher-order side; and a plurality of magnetic disk units 10-1, 10-2, ... which are connected as dependent units under control of the disk control unit 12. As typically shown in the magnetic disk unit 10-1, each of the magnetic disk units 10-1 and 10-2 has: a servo disk 14 which is rotated by a spindle motor 22; and a servo head 16 and data heads 20-1 to 20-3 which are moved in the disk radial direction by a voice coil motor 24 for data disks 18-1 to 18-3, respectively. Although the number of disks has been set to four, it can be properly set to an arbitrary number as necessary.

Further, an MPU 26 for drive control and a read/write section 35 are provided in the magnetic disk unit 10-1. The driving MPU 26 has a function of an off-track measuring section 84 according to the program control. An MPU 36 for command control is provided in the disk control unit 12. The MPU 36 has therein: a command control section 50 and an off-track measurement control section 52 which are realized by the program control; and a time table 54 which is used in the off-track measurement control. Channel control sections 38-1 and 38-2 interface with higher-order control channel devices 27-1 and 27-2. Through an internal bus 45, serial/parallel converting sections 42-1 and 42-2, a data transfer buffer section 46, and a system storage section 48 are connected to the MPU 36 for command control.

In the embodiment, two paths 120 and 122 are led out from the disk control unit 12 to the magnetic disk units 10-1, 10-2, .... Disk control sections 40-1 and 40-2 are provided for the paths 120 and 122, respectively. The disk control sections 40-1 and 40-2 transfer control commands from the MPU 36 for command control to the MPU 26 for drive control on the side of the magnetic disk units 10-1 and 10-2.

After the serial/parallel converting sections 42-1 and 42-2 of the disk control unit 12, data modulating sections 44-1 and 44-2 are provided and execute transmission and reception of write data or read data between the data modulating sections 44-1 and 44-2 and the read/write section 35 through the paths 120 and 122 on the side of the magnetic disk units 10-1 and 10-2. The write data or read data is once stored into the buffer 46 for data transfer and, after that, it is transferred to the magnetic disk unit or higher-order apparatus. As a higher-order apparatus for the disk control unit 12, a CPU 28 is connected through the channel devices 27-1 and 27-2 and a channel bus 34. A main storage unit 32 is connected through a main storage control unit 30.

In such a hardware construction, according to the present invention, the off-track measurement control section 52 which is realized by the program control is provided for the MPU 36 for command control in the disk control unit 12. In an operating state after the turn-on of the power source of the apparatus, the off-track measurement control section 52 generates off-track measurement commands to the dependent magnetic disk units 10-1, 10-2,—in accordance with a time schedule which has previously been stored in the time table 54. When the command control section 50 receives a command chain from the higher-order CPU 28, the command control section 50 generates a seek command in which a head address is added to a cylinder address to the designated magnetic disk unit 10-i. Therefore, in the magnetic disk units 10-1, 10-2, - - -, the head address can be known upon reception of the seek command and the correction table in which the off-track amounts have been stored can be referred.

Figure 2:
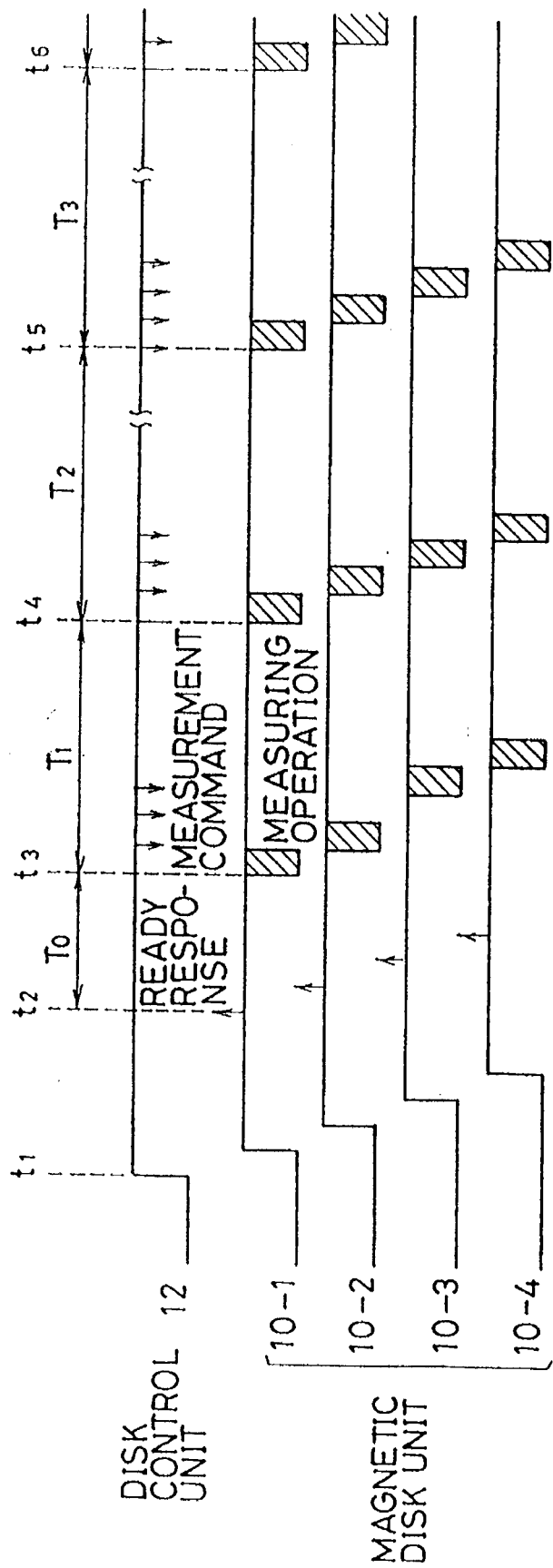
FIG. 2 is a time chart showing a start control of an off-track measurement.

FIG. 2 is a time chart showing a time schedule for the off-track measurement control in the off-track measurement control section 52. In FIG. 2, when the power source of the disk control unit 12 is first turned on at time $t_1$, the power sources are sequentially turned on in accordance with a power turn-on sequence on the basis of the order of the magnetic disk units 10-1, 10-2, - - -. FIG. 2 shows the case where four magnetic disk units 10-1 to 10-4 are connected as an example. The reason why the power sources of the magnetic disk units 10-1 to 10-4 are sequentially turned on in accordance with this order is because when the power sources are simultaneously turned on, rush currents excessively increase, so that it is necessary to reduce the rush currents by sequentially turning on the power sources one apparatus by one.

When the power sources of the magnetic disk units 10-1 to 10-4 are turned on, the disk rotation by the spindle motor 22 is started. When a rotational speed of each disk reaches a specified speed and the initial process is finished, a re-zero operation is executed. After that, a ready interruption from the magnetic disk unit 10-1 whose power source has first been turned on is obtained at time $t_2$. Subsequently, signals indicative of the ready interruption are also obtained as shown by arrows from the other magnetic disk units 10-2 to 10-4. When the disk control unit 12 receives the first ready interruption at time $t_2$, the disk control unit 12 activates a timer for off-track measurement. Set time intervals $T_0$, $T_1$, $T_2$, $T_3$, - - - have previously been stored in the time table 54 of the disk control unit 12 in accordance with the order of the elapsed times from the power-ON. For instance, the time intervals for off-track measurement are set so as to sequentially increase such that $T_0$=3 minutes, $T_1$=5 minutes, $T_2$=10 minutes, and $T_3$=20 minutes. This is because since a temperature change of the apparatus just after the power-ON is large, the off-track measuring process is executed at a short time interval and, in the case where the temperature of the apparatus becomes stable after the elapse of time, the time interval to measure the off-track is increased and is finally set to the longest predetermined time interval.

When the first time interval $T_0$ elapses at time $t_3$ under the control of the time schedule by the time table 54 as mentioned above, in the embodiment, the disk control unit 12 sequentially generates off-track measurement commands as shown by arrows in accordance with the order of the magnetic disk units 10-1, 10-2, 10-3, and 10-4. In the magnetic disk units 10-1 to 10-4, the off-track measuring process is executed as shown by hatched regions. After that, the measuring process is similarly executed due to the generation of the off-track measuring command with respect to times $t_4$, $t_5$, and $t_6$ at which the time intervals $T_1$, $T_2$, and $T_3$ have elapsed.

Figure 3B:
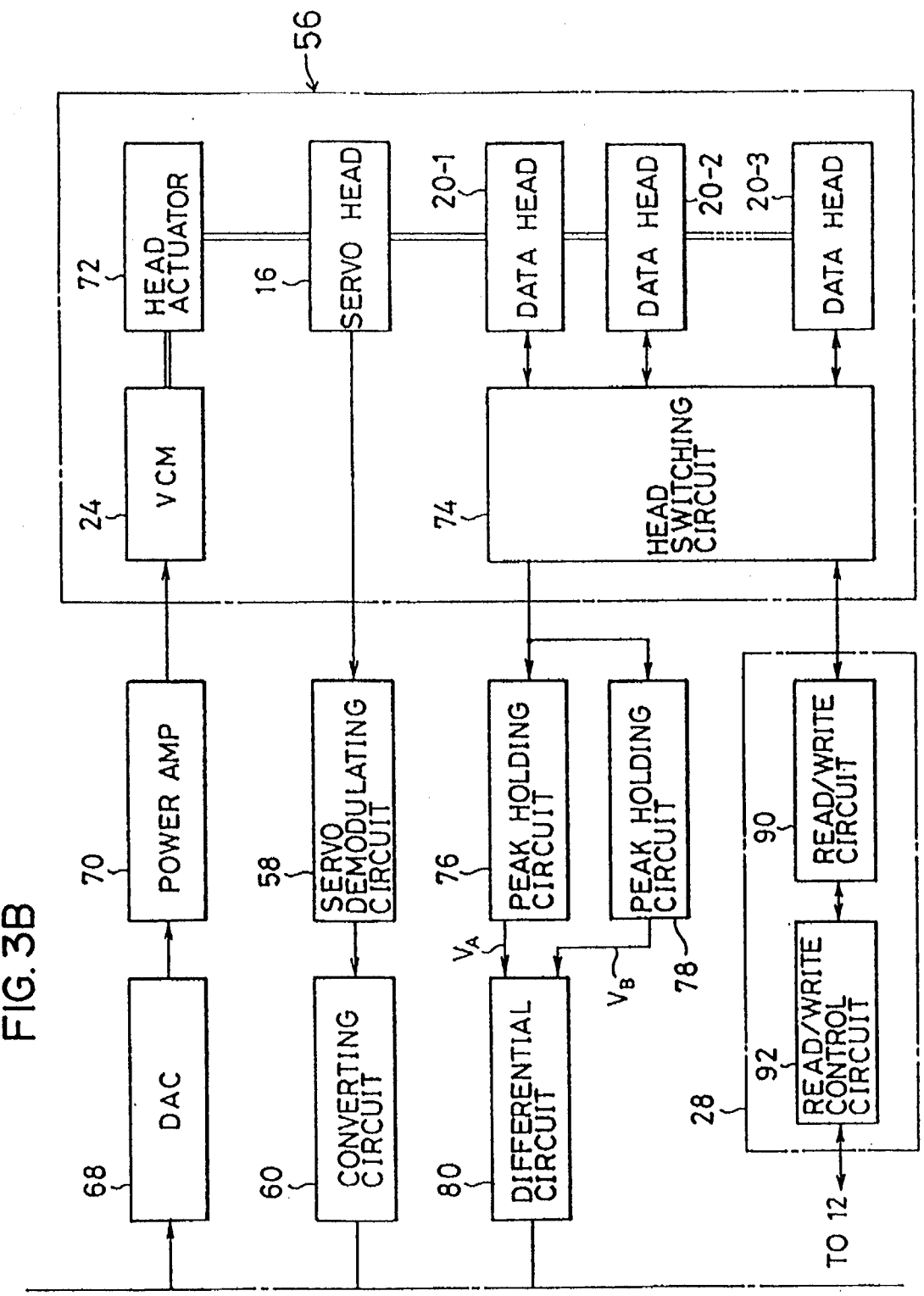

FIG. 3 is a constructional diagram of an embodiment showing in detail the magnetic disk unit of FIG. 1. In FIG. 3, the magnetic disk unit is constructed by the driving MPU 26, a disk enclosure 56, and a hardware to couple them. A head actuator 72 which is driven by the voice coil motor 24 is provided for the disk enclosure 56. The servo head 16 and a plurality of data heads 20-1 to 20-n are attached to the head actuator 72.

Figure 4:
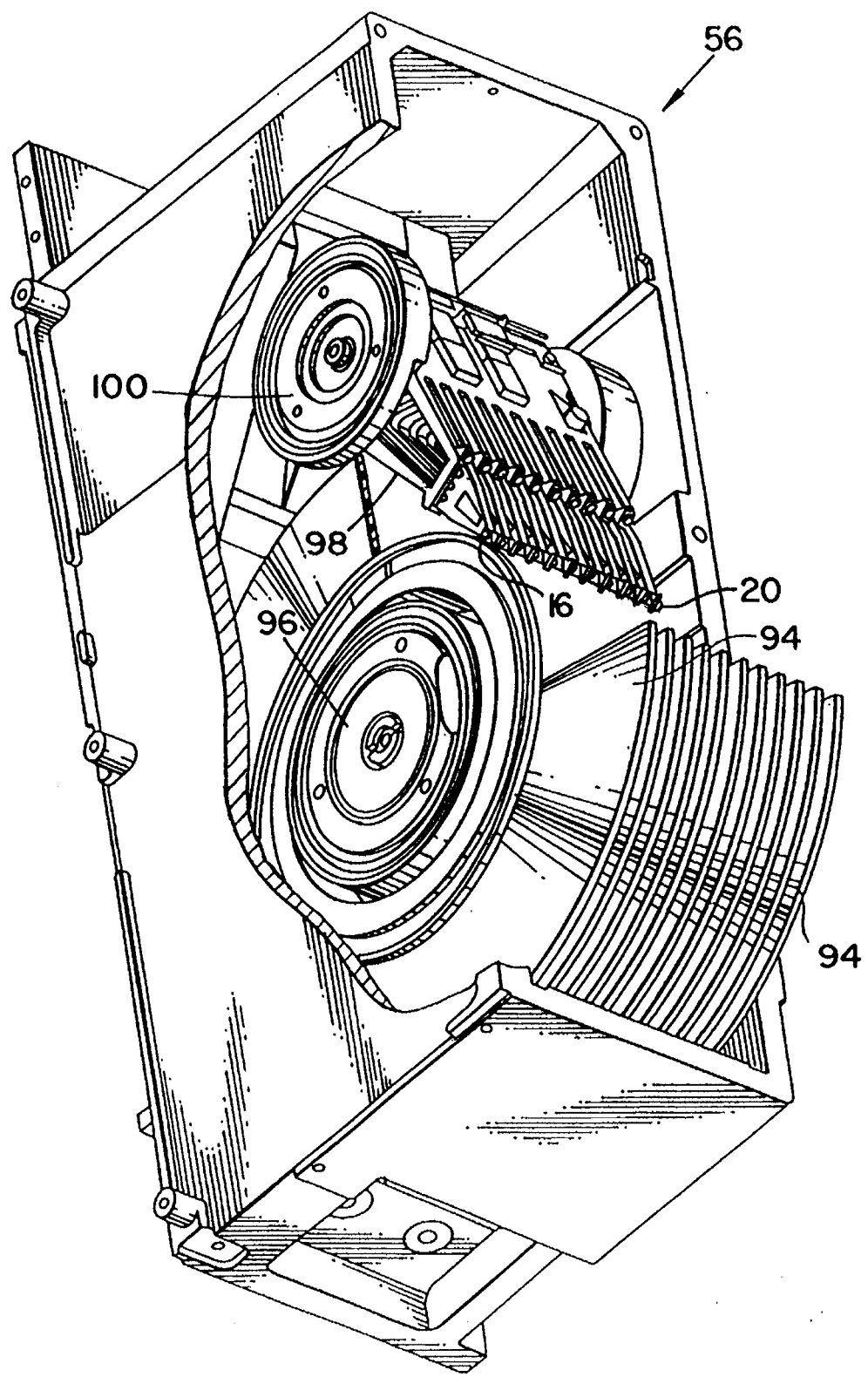
FIG. 4 is a perspective view of a disk enclosure.

FIG. 4 is an explanatory diagram with a part cut away showing a structure of the disk enclosure 56 in FIG. 3. In FIG. 4, eleven magnetic disks 94 in the embodiment are enclosed in the casing of the disk enclosure 56 and are attached to a disk rotary shaft 96 which is rotated by the spindle motor 22. Among the magnetic disks 94, for instance, the disk surface of the left edge surface is used as a servo surface and the other disk surfaces are used as data surfaces. As for the magnetic disk 94, the servo head 16 and a plurality of data heads 20 are supported by a head swing shaft 100 through a head arm 98. By rotating the head arm 98 around the head swing shaft 100 as a center, the servo head 16 and data head 20 can be integrally moved in the radial direction of the magnetic disk 94.

Figure 5:
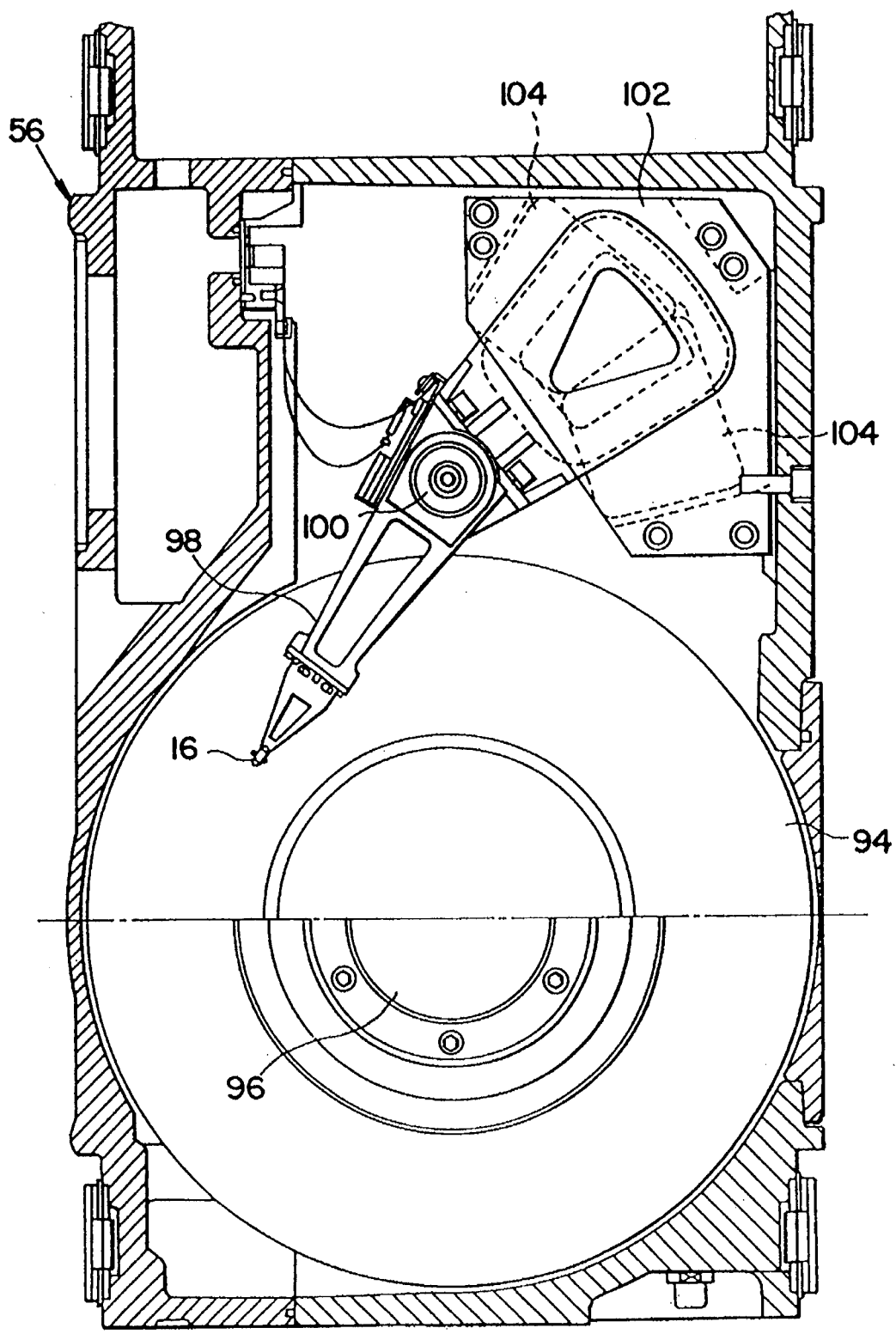
FIG. 5 is a cross sectional diagram showing an internal structure of the disk enclosure.

As shown in FIG. 5, on the head arm 98 side, a coil 104 constructing a voice coil motor is provided on the opposite side through the head swing shaft 100. On the casing side, a magnetic circuit 102 having a permanent magnet is fixed. Therefore, the head arm 98 is rotated around the head swing shaft 100 as a center in accordance with a current flowing in the coil 104 of the voice coil motor, thereby enabling the servo head 16 at the edge and the data head 20 to be integratedly positioned.

Returning to FIG. 3, the servo signal read by the servo head 16 is demodulated by a servo demodulating circuit 58 and converted into two position signals POSN and POSQ. Those position signals are supplied to a converting circuit 60. In the converting circuit 60, as shown in FIGS. 6A to 6D, the following signals are produced on the basis of the position signals POSN and POSQ from the servo demodulating circuit 58.

(N>Q) signal

[(N+Q)>0] signal

A track crossing pulse TXPL of FIG. 6E is generated by detecting the edges of the above two signals. By counting the number of track crossing pulses by a counter, the number of track passing times of the head is obtained.

Further, each signal from the converting circuit 60 is supplied to a positioning control section 62 of the driving MPU 26 and position data (position signal) which linearly changes every track as shown in FIG. 6F is produced. A head speed can be also obviously detected from a period of the track crossing pulse TXPL from the converting circuit 60.

A servo processing section comprising the positioning control section 62, an adding point 64, and a servo compensating section 66 is provided in the MPU 26 for drive control and is realized by the program control. The positioning control section 62 has a speed control section 114 and a position control section 116. The speed control section 114 executes a speed control for designating a target cylinder position by a cylinder address derived by the reception of the seek command and for positioning the head. According to the speed control, an acceleration current is first supplied to the voice coil motor 24 to drive the head actuator 72 to thereby accelerate the head to a predetermined speed and the number of remaining tracks until the target cylinder position is checked during the speed control by down counting the number of track crossing pulses TXPL from the number of tracks until the target cylinder position. When the number of remaining tracks decreases to a predetermined value, a deceleration current is supplied to the voice coil motor 24. When the head speed decreases to a specified speed or less, the control mode is switched to the position control by the position control section 116.

Figure 6:
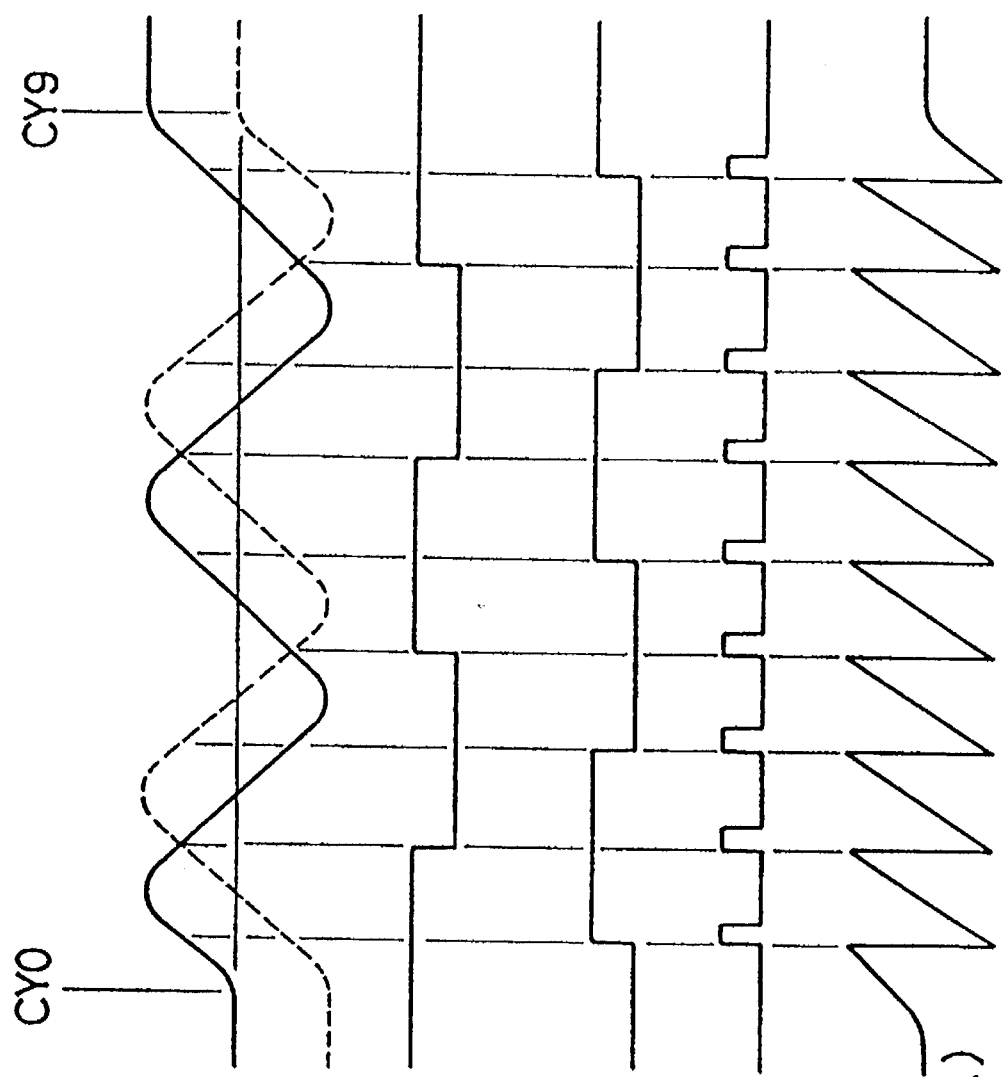
FIGS. 6A to 6F are time charts showing processing waveforms of a converting circuit in FIG. 3 and position data which is obtained as output signals.

The position control section 114 performs a positioning control so that the position signal which is derived from the converting circuit 60 is set to "0", thereby pulling in the head to the track center and allowing the head to trace the track. That is, position control data is supplied to the voice coil motor 24 through the servo compensating section 66 so that the position signal shown in FIG. 6 is always set to a "0" signal indicative of the track center. The servo compensating section 66 raises a gain of a high frequency portion of the servo signal and executes a pull-in phase compensation. Speed or position control data from the MPU 26 is converted into the analog voltage by a D/A converter 68. After that, the analog voltage is amplified by a power amplifier 70, thereby driving the voice coil motor 24.

On the other hand, the MPU 26 has therein the functions of the off-track measuring section 84, a correction table 86 using an RAM, and an off-track correcting section 88. The off-track measuring section 84 executes the off-track measuring process each time an off-track measuring command is received from the higher-order disk control unit 12.

Figure 7:
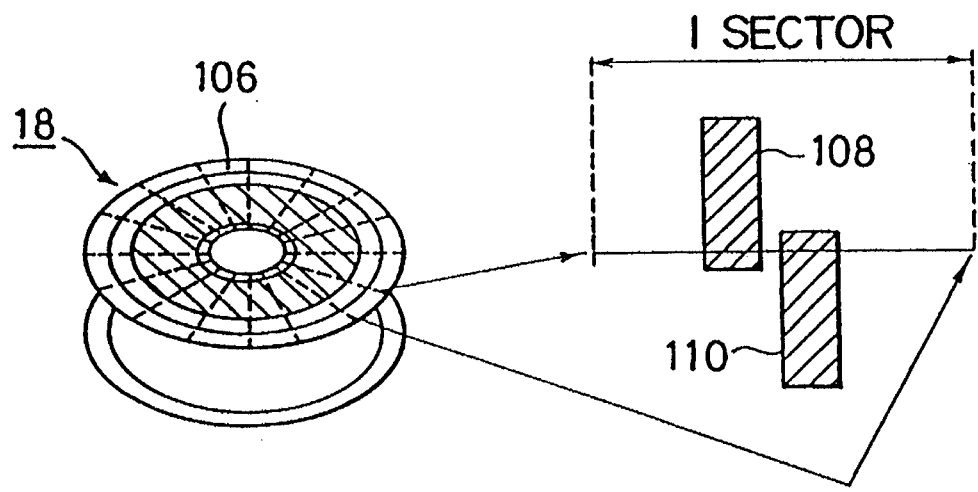
FIG. 7 is an explanatory diagram showing a recording state of servo information for a data surface.

The principle of the off-track measuring process according to the present invention will now be described as follows. FIG. 7 shows the data disk 18 which is provided in the disk enclosure 56. A servo information recording track 106 is provided at a predetermined cylinder position on the outside of a data region 112 shown as a hatched portion.

Servo information has been recorded on the servo information recording track 106 on a sector unit basis shown by a broken line in the radial direction.

Figure 8:
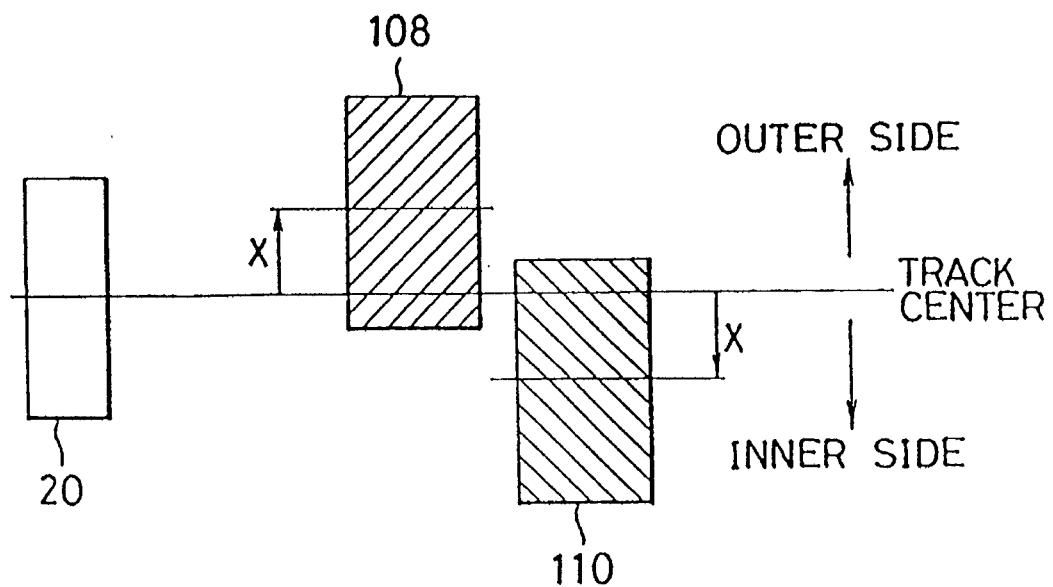
FIG. 8 is an explanatory diagram showing the positional relations of servo information on a track to a data head.

That is, as shown in FIG. 8, first servo information 108 of a frequency existing in the portion which is deviated by X [μ] to the outer side from the track center of the servo information recording track 106, for instance, the write highest frequency is written. Subsequently, second servo information 110 is is similarly written to the portion which is deviated to the inner side from the track center by X [μ].

Figure 9A:
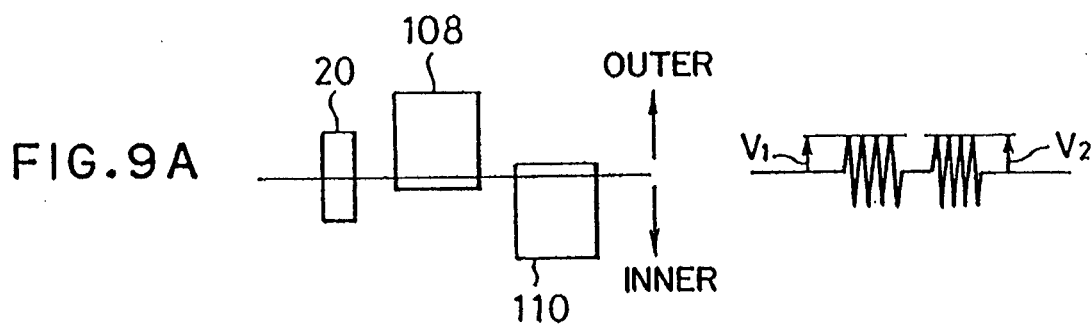
FIGS. 9A to 9C are explanatory diagrams of servo information read signals in association with an off-track of the data head.
Figure 9B:
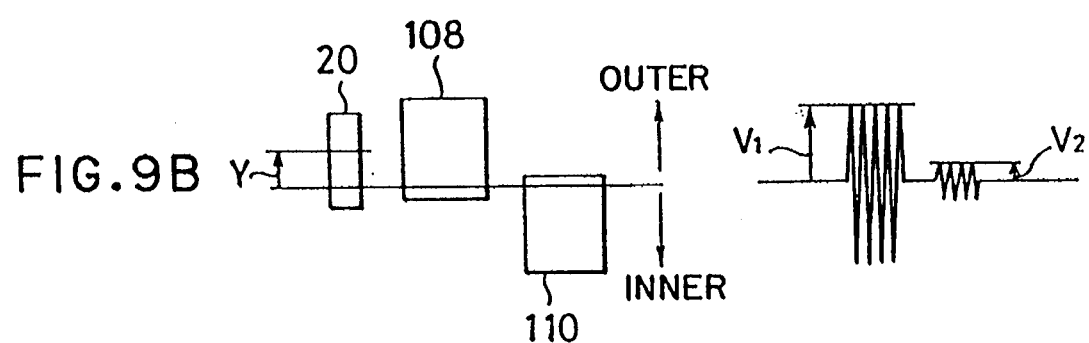
Figure 9C:
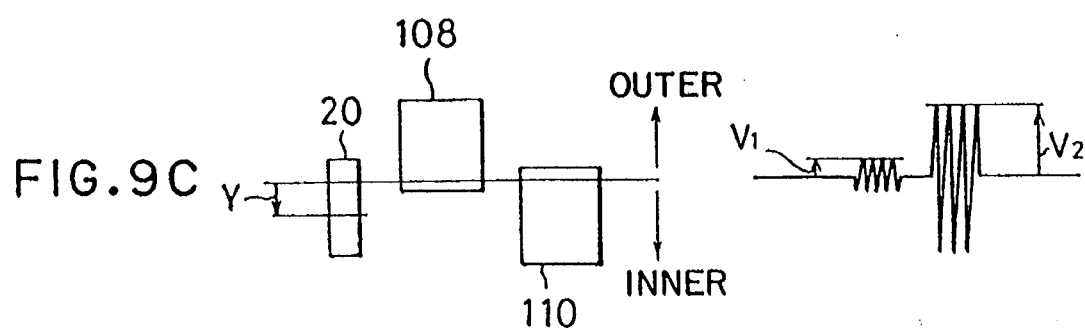

FIGS. 9A to 9C show read signals by the data head 20 after the data head 20 was positioned to the servo information recording track 106. First, as shown in FIG. 9A, when the data head 20 on-tracks at the track center, the servo information 108 and 110 are uniformly read out, so that read signals $V_1$ and $V_2$ which are outputted from the data head 20 are equal.

On the other hand, when the data head 20 off-tracks to the outer side as shown in FIG. 9B, the servo information 108 of an amount larger than the servo information 110 is read out, so that a level of the read signal $V_1$ is larger than that of the read signal $V_2$. Further, as shown in FIG. 9C, when the data head 20 off-tracks to the inner side, the servo information 110 of an amount larger than that of the servo information 108 is read out, so that a level of the read signal $V_2$ is larger than that of the read signal $V_1$.

Figure 10:
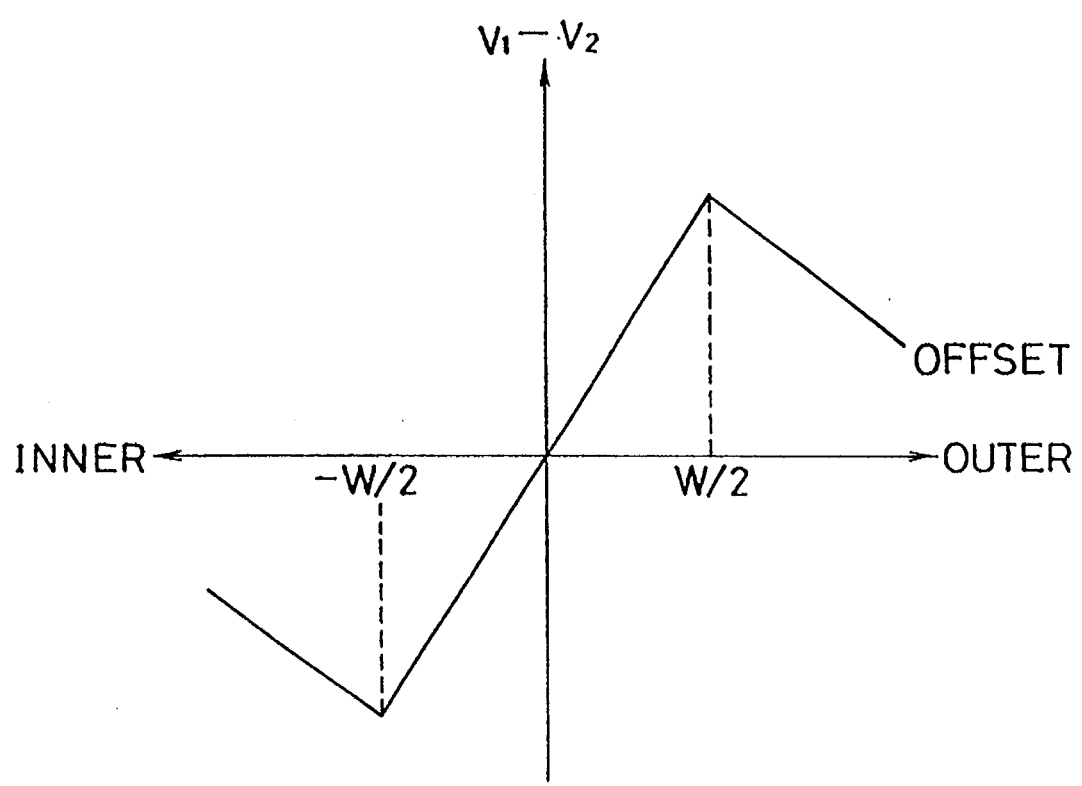
FIG. 10 is a characteristic diagram of a servo information read difference signal for an off-track amount.

In the off-track measuring process, therefore, a difference signal $(V_1-V_2)$ between the read signals $V_1$ and $V_2$ from the servo information recording track 106 obtained from the data head 20 is read, thereby detecting an off-track amount. As shown in FIG. 10, there is a relation of a predetermined proportional coefficient (gradient) K between the off-track amount and the read difference signal $(V_1-V_2)$. Therefore, by multiplying the proportional coefficient K to the read difference signal $(V_1-V_2)$ of the data surface servo information 108 and 110, an off-track amount α can be calculated. Namely, the off-track amount α of the data surface servo information is calculated by the following equation.

$$\alpha = K \times (V_1 - V_2)$$

The measurement of the off-track amount in the magnetic disk unit as mentioned above is realized by a hardware comprising a head switching circuit 74, peak holding circuits 76 and 78, a differential circuit 80, and an A/D converter 82 in addition to the off-track measuring section 84 provided in the MPU 26 for drive control. That is, the data heads 20-1 to 20-n are connected to the head switching circuit 74. When receiving a change-over signal from the MPU 26, the head switching circuit 74 sequentially supplies the read signals from the data heads 20-1 to 20-n to the peak holding circuits 76 and 78 one by one in accordance with the order. Under a timing control from the MPU 26, the peak holding circuit 76 holds the peak value $V_1$ of the read signal of the first servo information 108 recorded on the servo information recording track of the data surface. Under a timing control from the MPU 26, similarly, the peak holding circuit 78 holds the peak value $V_2$ of the read signal of the second servo information 110 recorded on the servo information recording track 106 of the data surface. The difference circuit 80 generates a difference signal $(V_1-V_2)$ between the output signals of the peak holding circuits 76 and 78. The difference signal $(V_1-V_2)$ is converted into the digital data by an A/D converter 82. The digital data is supplied to the off-track measuring section 84 of the MPU 26.

The off-track measuring section 84 calculates the off-track amount α by using the proportional coefficient K shown in FIG. 10 and stores the off-track amount α into the correction table 86 while using the head address of the data head 20-1 as an address pointer. By repeating the above processes with respect to all of the remaining data heads 20-2 to 20-n, the off-track amount α is stored into the correction table 86 for each of the data heads 20-1 to 20-n.

In the ordinary access processing operation, the off-track correcting section 88 executes a positioning control accompanied with the off-track correction by using the off-track amount stored in the correction table 86. That is, when -the seek command is received from the higher-order disk control unit 12 and the data heads 20-1 to 20-n are sought together with the servo head 16 to the target cylinder position and the control mode is switched to the positioning control, the off-track amount α is read out from the correction table 86 while using the head number of the data head specified by a command in this instance as an address.

The off-track correcting section 88 executes a correction for eliminating the off-track amount by adding the off-track correction amount α to the target position signal from the positioning control section 62 at that time in the opposite direction. Servo information to position the data head to the track center of the track corresponding to the target cylinder is produced from the adding point 64. The voice coil motor 24 is driven on the basis of the servo information, thereby executing the positioning control of the data head. A read/write circuit 90 and a read/write control circuit 92 shown in FIG. 3 construct the read/write section 35 shown in FIG. 1.

Figure 11:
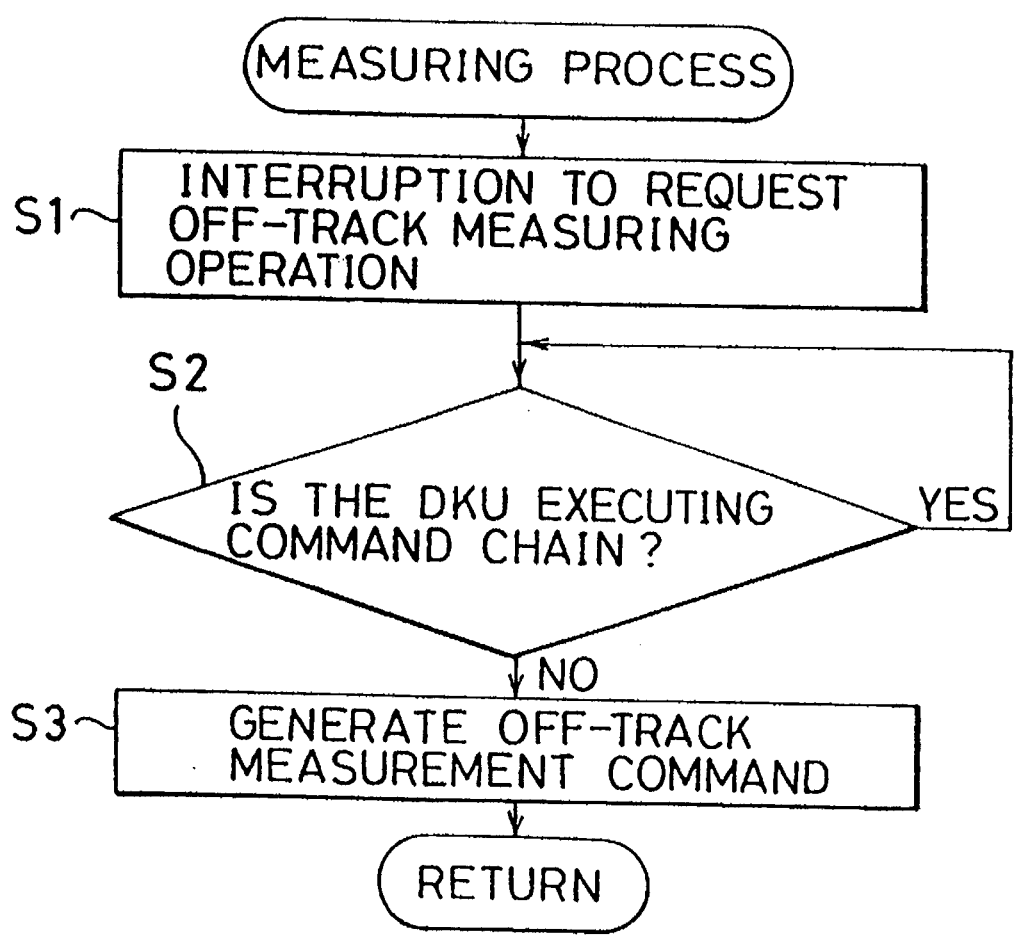
FIG. 11 is a flowchart showing the off-track measurement control according to the present invention.

FIG. 11 is a flowchart showing a measurement control process by the off-track measurement control section 52 provided for the MPU 36 for command control of the disk control unit 12 in FIG. 1. In FIG. 11, when receiving a request interruption of the off-track measuring operation in accordance with a time schedule based on the time table as shown in FIG. 2 in step S1, the corresponding magnetic disk unit judges whether the command chain is being executed or not in step S2. Whether the command chain is being executed or not can be also checked on the disk control unit 12 side without inquiring such a judgment to the magnetic disk unit side. When the command chain is being executed, the apparatus waits for the completion of the execution of the command chain. After that, the processing routine advances to step S3 and supplies the off-track measuring command to the magnetic disk unit.

Figure 12:
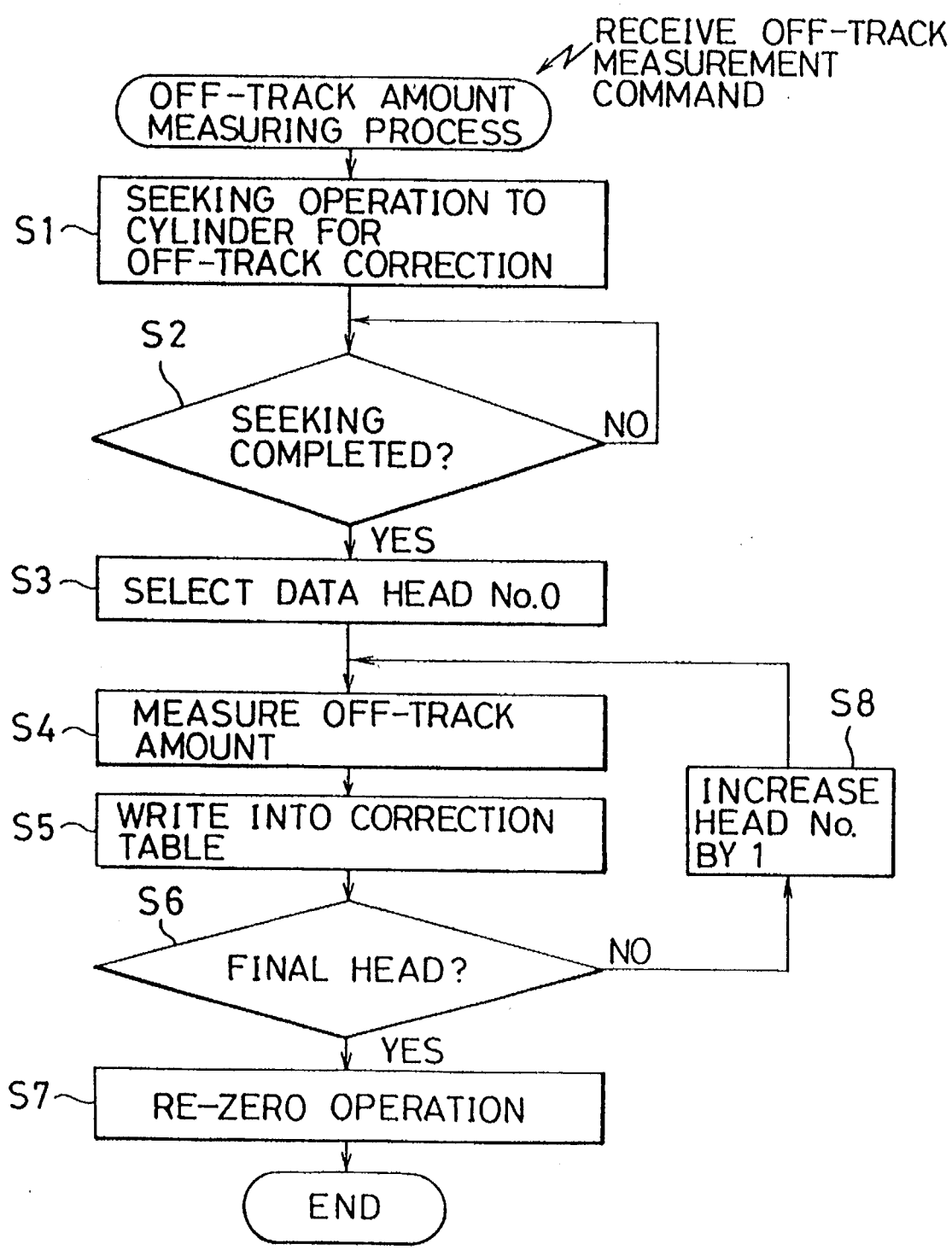
FIG. 12 is a flowchart showing an off-track measuring process according to the present invention.

FIG. 12 is a flowchart showing the off-track measuring process by the off-track measuring section 84 provided for the MPU 26 for drive control in FIG. 3. In FIG. 12, when the off-track measuring command is received from the higher-order disk control unit 12, the off-track measuring process is started while using the reception of such a command as an interruption. In the off-track measuring process, the seeking operation to seek the head to the cylinder position for correction of the off-track is first executed in step S1. After completion of the seeking operation in step S2, the head address=0 of the data head 20 is selected in step S3. An off-track amount is measured in step S4. After completion of the measurement of the off-track amount, the off-track amount α obtained is written into the correction table 86 in step S5 while using the head address=0 as an address pointer. Subsequently, a check is made in step S6 to see if the head is the final head or not. If NO, step S8 follows and the head number is increased by "1". After that, the measurement of the off-track amount is again executed in step S4. After the measurement of the off-track amounts regarding all of the data heads is finished, the processing routine advances from step S6 to step S7 and a re-zero operation is performed. After that, the processing routine is returned to a ready state.

Figure 13:
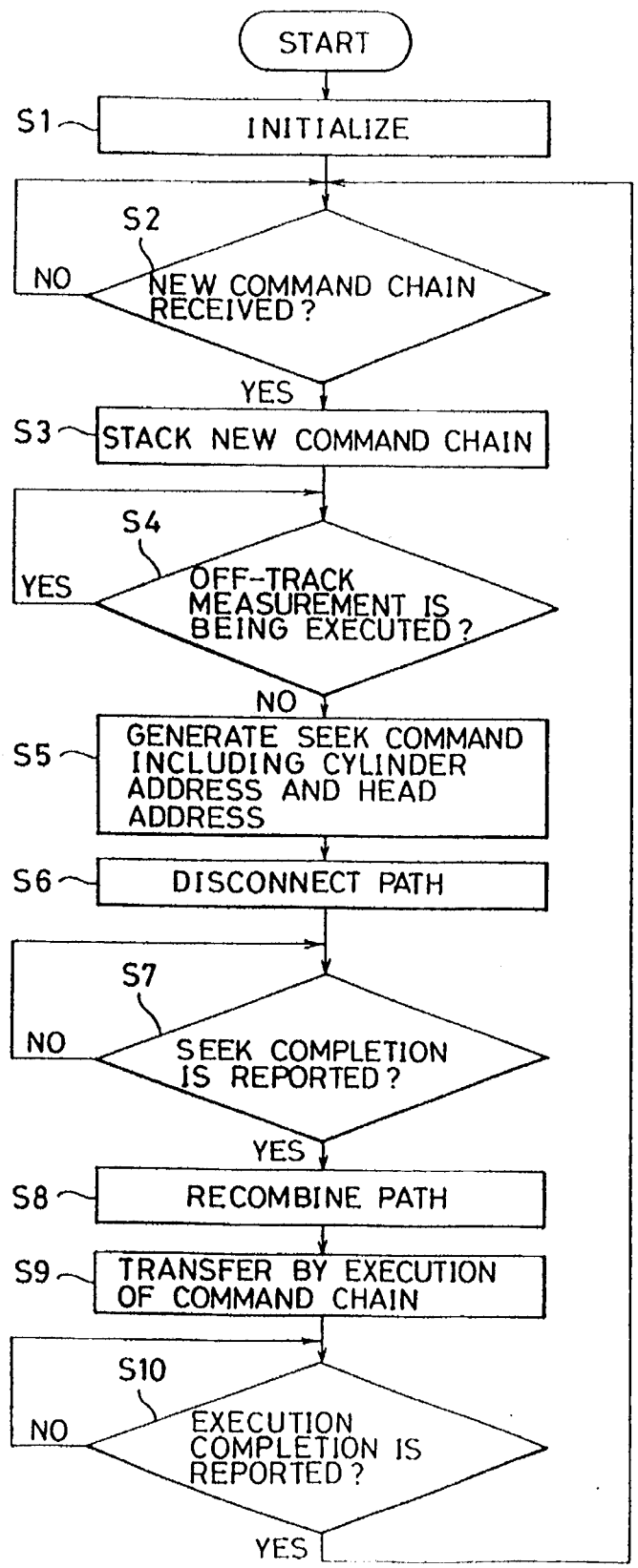
FIG. 13 is a flowchart showing an access control of the disk control unit according to the present invention.

FIG. 13 is a flowchart showing an access control process by the disk control unit 12 shown in FIG. 1. In FIG. 13, when the power source of the disk control unit 12 is turned on, a predetermined initializing process is executed in step S1. When ready responses are received from the dependent magnetic disk units 10-1, 10-2, - - - connected to the disk control unit 12, the processing routine advances to step S2.. In step S2, a check is made to see if a new command chain has been received from the higher-order CPU 28 or not. If YES, the command chain is stacked in step S3. In step S4, a check is made to see if the magnetic disk unit designated as a target to be accessed, for example, the magnetic disk unit 10-1 is executing the off-track measurement or not. If YES, the processing routine advances to step S5 after completion of the execution of the off-track measurement.

In step S5, the seek command including the cylinder address and head address is supplied to the magnetic disk unit 10-1. After the seek command was generated, the path is disconnected from the magnetic disk unit 10-1 in step S6. A check is made in step S7 to see if a report indicative of the completion of the seeking operation has been sent from the magnetic disk unit 10-1 or not. When the seek completion report is received, the path is again connected to the magnetic disk unit 10-1 in step S8. After that, the data transfer by the execution of the command chain is performed in step S9. That is, in the reading operation, the read data read out from the magnetic disk unit 10-1 is transferred to the CPU 28. In the writing operation, the write data from the CPU 28 is transferred to the magnetic disk unit 10-1. In the final step S10, when a execution completion report of the reading or writing operation is received from the magnetic disk unit 10-1, the processing routine is returned to step S2 and the apparatus again waits for the reception of a new command chain.

Figure 14:
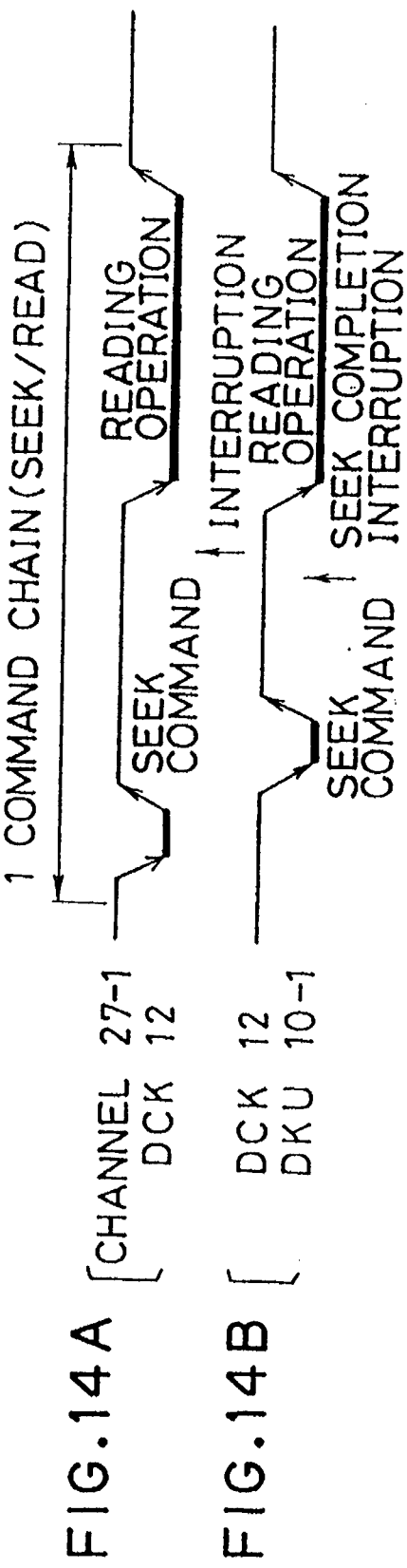
FIG. 14A is a time chart showing the operations between channel devices and the disk control unit according to the present invention.
FIG. 14B is a time chart showing the operations between the disk control unit and the magnetic disk unit according to the present invention.

FIG. 14A is a time chart showing processing operations between the channel device 27-1 and the disk control unit 12 in the embodiment of FIG. 1. FIG. 14B is a time chart showing processing operations between the disk control unit 12 and the magnetic disk unit 10-1 in the embodiment of FIG. 1. Portions shown by bold lines indicate coupling states of the interfaces between the channel device 27-1 and the disk control unit 12 and between the disk control unit 12 and the magnetic disk unit 10-1.

First, a command chain comprising the seek command and read command is given from the channel device 27-1 to the disk control unit 12 under control of the CPU 28. By receiving the command chain, the channel device 27-1 generates the seek command to the disk control unit 12 as shown in FIG. 14A. After the seek command was generated, the path between the channel device 27-1 and the disk control unit 12 is disconnected.

When receiving the seek command, the disk control unit designates the magnetic disk unit 10-1 as shown in FIG. 14B and generates the seek command. After the seek command was generated, the path between the disk control unit 12 and the magnetic disk unit 10-1 is disconnected. The magnetic disk unit 10-1 subsequently executes the seek command. After completion of the seeking operation, the seek completion interruption is set into the disk control unit 12. The path between the disk control unit 12 and the magnetic disk unit 10-1 is again connected.

In response to the seek completion interruption, the disk control unit 12 sets the interruption into the channel device 27-1 as shown in FIG. 14A. The path between the channel device 27-1 and the disk control unit 12 is also connected due to this. After the path was again connected, the magnetic disk unit 10-1 starts the reading operation and sends the data obtained by the reading operation to the channel device 27-1 through the disk control unit 12. A series of command chain is finished.

During the execution of one command chain as mentioned above, hitherto, when the off-track measuring operation is started on the magnetic disk unit 10-1 side for a period of time from a time point at which the seek command is generated and the path is disconnected to a time point at which the path is again connected due to the seek completion interruption, the seeking operation is interrupted until the end of the off-track measuring process. Therefore, since the reading operation in which the seek completion interruption based on the command chain has been set is started after completion of the off-track measuring process, there is a case where the execution of the command chain is delayed for only the off-track measuring processing time.

According to the present invention, however, during the execution of the command chain, as shown in the off-track measurement control process in FIG. 11, even when the interruption request of the off-track measurement is generated, the generation of the off-track measuring command from the disk control unit to the magnetic disk unit is suppressed. Consequently, the execution of the command chain is not interrupted. After completion of the execution of the command chain, the off-track measuring operation by the generation of the off-track measuring command is executed. The off-track measuring process can be efficiently processed in accordance with the time schedule without obstructing the execution of the command chain.

Figure 15:
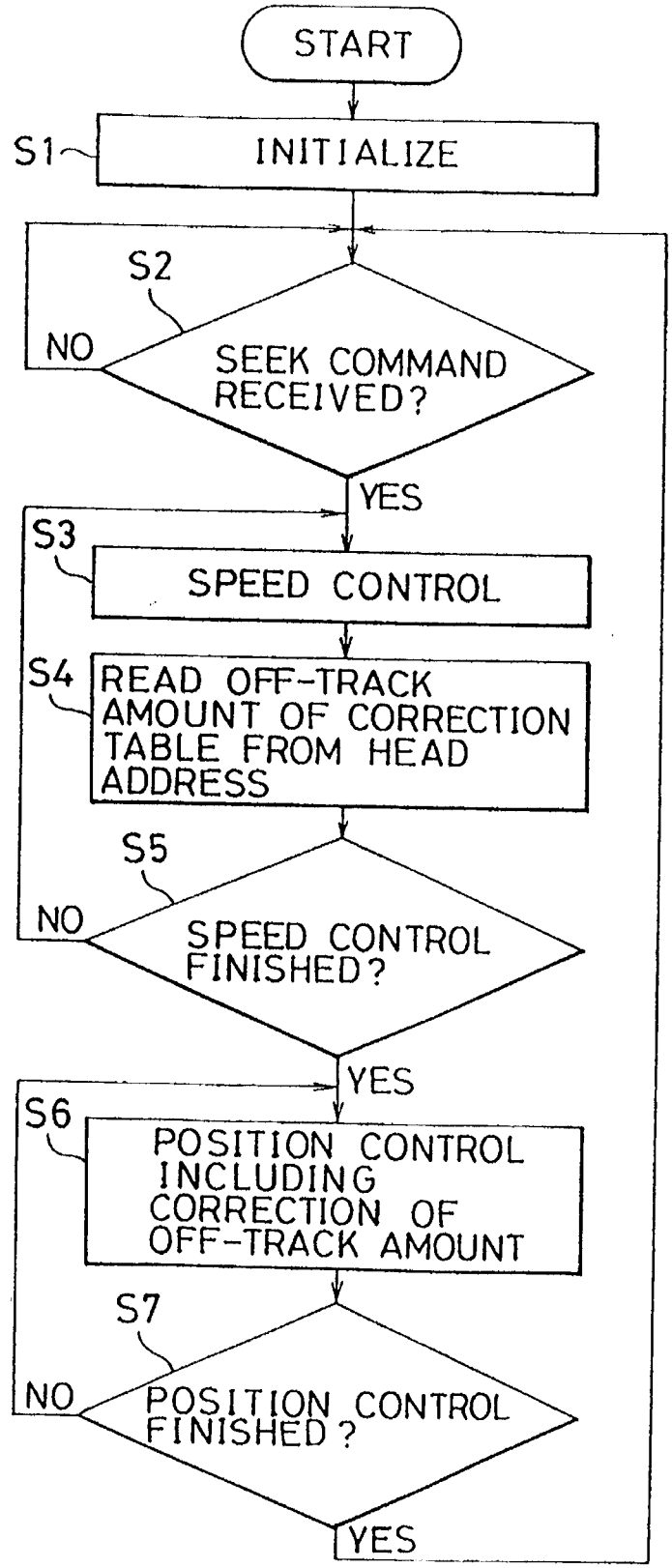
FIG. 15 is a flowchart showing a positioning control accompanied with an off-track correction in the magnetic disk unit according to the present invention.

FIG. 15 is a flowchart showing the positioning control process in the magnetic disk unit shown in FIG. 3. In FIG. 15, in response to the turn-on of the power source of the higher-order disk control unit 12, when the power source of the dependent magnetic disk unit connected to the disk control unit 12 is turned on, a predetermined initializing process is executed in step S1. When the apparatus is set into a ready state by the re-zero operation, step S2 follows. In step S2, a check is made to see if the seek command has been received from the disk control unit 12 or not. When the seek command including the cylinder address and the head address is received, the processing routine advances to the speed control in step S3. In the speed control in step S3, the target cylinder position is known from the cylinder address obtained by the reception of the seek command and a speed control of the head actuator 72 is performed by the voice coil motor 24 so as to execute a speed control of the head such that the head is moved to the target cylinder position. Practically speaking, an acceleration current is supplied to the voice coil motor 24 to thereby accelerate the voice coil motor to a predetermined speed. The track crossing pulse TXPL in FIG. 6E is obtained from the position data that is obtained during the speed control. The number of track crossing pulses is subtracted from the number of tracks existing up to the target cylinder position, thereby obtaining the number of remaining tracks. When the number of remaining tracks until the target cylinder position during the speed control decreases to a predetermined value, a deceleration current is supplied to the voice coil motor 24, thereby performing the head deceleration control. When the head moving speed is equal to or less than a specified speed due to a decrease in head moving speed by the deceleration of the head, the end of speed control is judged in step S5. The processing routine advances to step S6.

According to the present invention, further, simultaneously with the start of the speed control in step S3, the off-track amount of the data head to be positioned to the target track is read out with reference to the correction table 86 from the head address derived by the reception of the seek command in step S4 during the speed control. The read-out off-track amount is set into the off-track correcting section 88. An off-track correcting state such that the off-track amount is eliminated from the target position signal which is supplied to the adding point 64 from the position control section 116 of the positioning control section 62 is previously satisfied when the control mode is switched to the position control.

When the head reaches the target cylinder position by the speed control and the speed decreases to the specified speed or less, the end of the speed control is judged in step S5. After that, step S6 follows and the position control in consideration of the correction of the off-track amount is executed. That is, the speed control of the speed control section 114 in the positioning control section 62 is cancelled and switched to the position control by the position control section 116. The target position signal is supplied from the position control section 116 to the adding point 64 so as to pull in the head to the track center while using the position data signal shown in FIG. 6F as a zero signal.

At the same time, the off-track correction amount set during the speed control is added by the off-track correcting section 88. The target position signal from which the off-track amount has been eliminated is supplied to the voice coil motor 24. The position control accompanied with the off-track correction is immediately started. Simultaneously with the position control, the head switching circuit 74 switches the data head to the head address obtained by the reception of the seek command, thereby allowing the reading or writing operation to be executed. In the final step S7, when the reading or writing operation is finished and the position control is completed, the processing routine is again returned to step S2. The apparatus waits for the reception of the next seek command.

According to the present invention as mentioned above, since the head address in addition to the cylinder address are also notified by the seek command, during the seeking operation to move the head to the target cylinder position, the off-track amount is read out by the head address with reference to the correction table and the off-track correcting state such that the off-track amount is eliminated from the position control signal can be produced until the completion of the seeking operation. Therefore, the reading or writing operation can be soon started after completion of the seeking operation. The processes can be executed at a high speed without needing to wait for the disk rotation for the off-track correction.

In the above embodiment, as shown in FIG. 7, explanation has been made with respect to the example in the case where the track 106 to record the servo information is provided on the outside of the data region 112 and the data head 20 is sought to the track 106 upon measurement of the off-track and the off-track measuring process is executed. However, the servo information 108 and 110 can be also recorded into idle spaces of all of the sectors in the data region 112 as shown in FIG. 8. The off-track measuring process of the present invention can be also applied to the case where the servo information is recorded into all of the sectors of the data region as mentioned above. In this case, since the off-track amount can be measured every cylinder position, the off-track correction of a higher accuracy can be realized.

The above embodiment has been described with respect to the example in the case of using both of the following functions.

(I) The off-track measurement control function to manage the time schedule for the off-track measuring processes in the lower-order magnetic disk units by the higher-order disk control unit.

(II) The off-track correcting function such that the head address is included in the seek command from the disk control unit, the off-track amount is obtained from the correction table and the off-track correcting state in the position control is produced for a period of time during which the seeking operation is being executed by the magnetic disk unit.

However, the present invention can be also modified as follows.

The first modification relates to a magnetic disk unit in which no head address is included in the seek command from the disk control unit but the off-track correction is executed in response to the reception of the notification of the head address accompanied with the seek completion. The off-track measurement control function mentioned in the above item (I) is provided for the disk control unit to which a plurality of dependent magnetic disk units are connected.

The second modification relates to a plurality of dependent magnetic disk units connected to the disk control unit under control thereof. In case of independently managing the time schedule of the off-track measuring process, the off-track correcting function in the above item (II) is provided.

Although the embodiment has been described with respect to the example of the disk array system in which a plurality of dependent magnetic disk units are connected to the disk control unit, the present invention is not limited to such an example but can be also applied as it is to an ordinary magnetic disk apparatus in which one magnetic disk unit is connected to the disk control unit.

The present invention is not limited to the foregoing embodiment but many modifications and variations are possible within the spirit and scope of the appended claims of the invention. Further, the invention is not limited by the numerical values shown in the embodiment.

What is claimed is:

1. A magnetic disk apparatus comprising:

disk control means for receiving and decoding command chains each including a seek command and a read or write command from a higher-order apparatus, and for executing said command chains by respectively generating seek commands including a cylinder address, and read commands or write commands including a head address subsequent to said seek commands;

servo information reading means for reading out servo information by using a servo head from a servo disk medium on which the servo information has previously been recorded;

selecting means for selecting, based on execution of said command chains by said disk control mean, one of a plurality of data heads each of which is provided for each of a plurality of data disk medium for writing or reading disk data;

speed control means for allowing said servo head and a plurality of data heads to be respectively moved to positions of the cylinder address designated by said seek commands and for performing a speed control to said servo head and said data heads on the basis of the servo information obtained from said servo information reading means;

position control means for allowing the head to be pulled in to a track center and for allowing the head to trace the track when the servo head and said plurality of data heads reach a position just before the designated cylinder address position by said speed control means;

correction table means in which off-track amounts which the data heads have when the servo head has been positioned to a reference cylinder position of the servo disk medium have been stored;

off-track correcting means for correcting a position control signal of said position control means by the off-track amount read out by the head address designated by the read commands or write commands with reference to said correction table means;

off-track measurement control means for detecting whether said disk control means is executing multiple command chains and for instructing, when execution of multiple command chains is not detected or after completion of multiple command chains when execution of command chains is detected so that execution of the multiple command chains is not interrupted, a measuring process of the off-track amount in accordance with a predetermined time schedule; and off-track measuring means for measuring the off-track amount which each of said data heads has when the servo head is positioned to a predetermined reference cylinder position of the servo disk medium when a measuring command is received from said off-track measurement control means and for storing said measured off-track amounts into said correction table means.

2. An apparatus according to claim 1, wherein said off-track measurement control means instructs the off-track measuring process in accordance with a time table in which a time interval according to a change in environmental temperature just after the turn-on of a power source of the apparatus has been set.

3. An apparatus according to claim 1, wherein said off-track measurement control means instructs the off-track measuring process in accordance with a time table in which a time interval has been set so as to sequentially increase with the elapse of a time just after the turn-on of a power source of the apparatus.

4. An apparatus according to claim 1, wherein first and second servo information have previously been recorded on said data disk medium so as to off-track by only predetermined amounts in different directions for a track center at a cylinder position of the data disk medium corresponding to the reference cylinder position of the servo disk medium, and said off-track measuring means calculates an off-track amount $\alpha$ on the basis of a difference signal $(V_1-V_2)$ of the read signals of the first and second servo information recorded on said data disk medium.

5. An apparatus according to claim 1, wherein a plurality of magnetic disk units each comprising said servo reading means, selecting means, speed control means, position control means, correction table means, off-track correcting means, and off-track measuring means are connected to said disk control means under control thereof.

6. A magnetic disk apparatus comprising:

disk control means for receiving and decoding command chains each including a seek command and a read or write command from a higher-order apparatus, and for executing said command chains by respectively generating seek commands including a cylinder address and a head address, and read commands or a write commands subsequent to said seek commands;

servo information reading means for reading out servo information by using a servo head from a servo disk medium on which the servo information has previously been recorded;

selecting means for selecting, based on execution of said command chains by said disk control means, one of a plurality of data heads each of which is provided for each of a plurality of data disk media for writing or reading disk data;

speed control means for allowing the servo head and said plurality of data heads to be respectively moved to positions of the designated cylinder address by the seek command and for performing a speed control for said servo head and said data heads on the basis of the servo information obtained from said servo information reading means;

position control means for allowing the head to be pulled in to a track center and for allowing the head to trace a track when the servo head and the plurality of data heads reach a position just before said designated cylinder address position by said speed control means;

correction table means in which off-track amounts which the data heads have when the servo head has been positioned to a reference cylinder position of the servo disk medium have been stored;

off-track correcting means for reading out the off-track amounts by the head address obtained upon reception of the seek commands with reference to said correction table means and for producing an off-track correcting state such that the off-track amount has been eliminated from a position control signal in said position control means during the execution of the seek commands;

off-track measurement control means for detecting whether said disk control means is executing multiple command chains and for instructing, when execution of a command chain is not detected or after completion of multiple command chains when execution of multiple command chains is detected so that execution of said multiple command chains is not interrupted, a measuring process of the off-track amount in accordance with a predetermined time schedule; and off-track measuring means for measuring the off-track amounts which the data heads have when the servo head has been positioned to a predetermined reference cylinder position of the servo disk medium in case of receiving a measuring command from said off-track measurement control means and for storing the off-track amounts into said correction table means.

7. An apparatus according to claim 6, wherein said off-track measurement control means instructs the off-track measuring process in accordance with a time table in which a time interval according to a change in environmental temperature just after the turn-on of a power source of the apparatus has been set.

8. An apparatus according to claim 6, wherein said off-track measurement control means instructs the off-track measuring process in accordance with a time table in which a time interval has been set so as to sequentially become long with the elapse of a time just after the turn-on of a power source of the apparatus.

9. An apparatus according to claim 6, wherein first and second servo information have previously been recorded on the data disk medium so as to off-track by only predetermined amounts in different directions for a track center of the cylinder position of the data disk medium corresponding to a reference cylinder position of the servo disk medium, and said off-track measuring means calculates an off-track amount $\alpha$ on the basis of a difference signal $(V_1-V_2)$ of the read signals of the first and second servo information recorded on the data disk medium.

10. An apparatus according to claim 6, wherein a plurality of magnetic disk units each comprising said servo reading means, selecting means, speed control means, position control means, correction table means, off-track correcting means, and off-track measuring means are connected to said disk control means under control thereof.

* * * * *

UNITED STATES PATENT AND TRADEMARK OFFICE
CERTIFICATE OF CORRECTION

PATENT NO. : 5,526,201
DATED : June 11, 1996
INVENTOR(S) : Takata et al.

It is certified that error appears in the above-indentified patent and that said Letters Patent is hereby corrected as shown below:

On the Title Page:

Under "[75] Inventors:" delete "Yamamato" and insert --Yamamoto--

Column 3, line 16, delete "The off-track" and insert --the off-track--.

Column 9, line 9, delete "110 is is" and insert --110 is--.

Column 11, line 7, delete "52 " and insert --S2.--.

Column 14, line 54, after "disk control" delete "mean" and insert --means--.

Column 15, line 64, after "read commands or" delete "a".

Signed and Sealed this

Twenty-second Day of July, 1997

Attest:

BRUCE LEHMAN

*Attesting Officer*         *Commissioner of Patents and Trademarks*